UNITED STATES PATENT OFFICE.

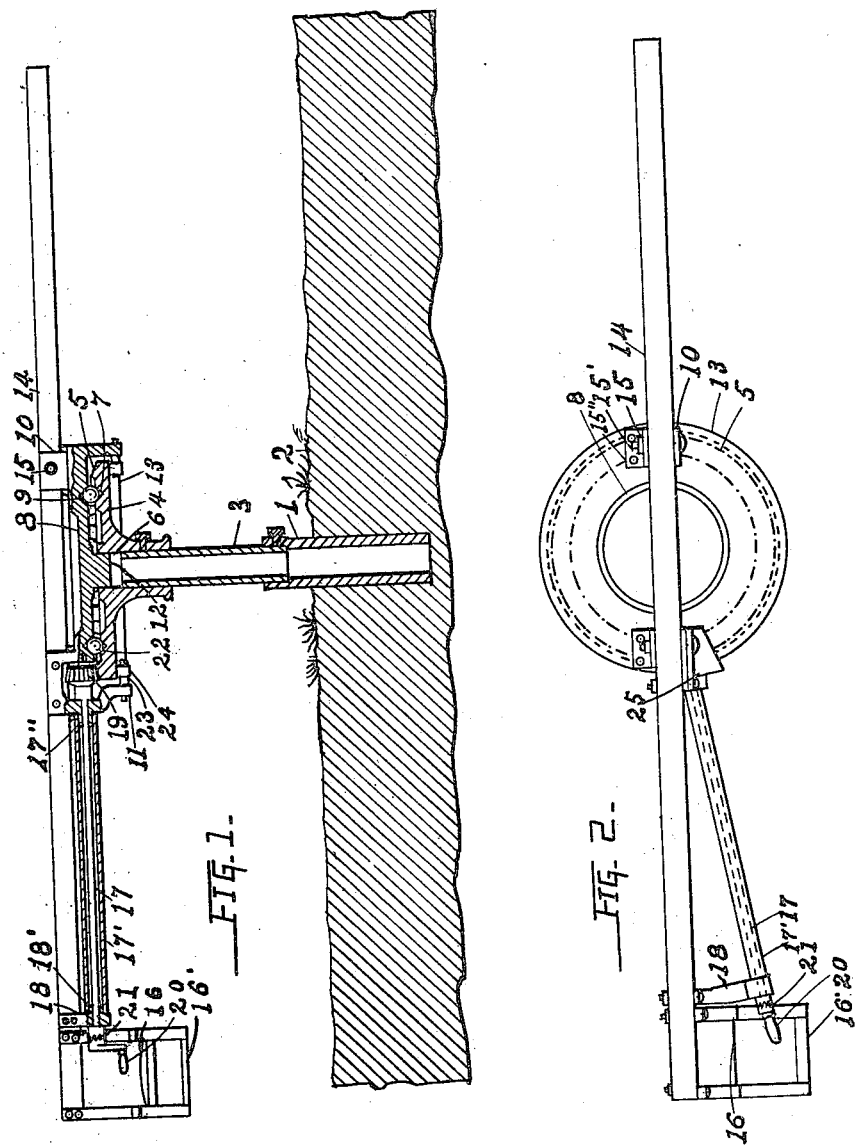

JAMES SHULTZ, OF ST. JOSEPH, MISSOURI.

MERRY-GO-ROUND.

1,252,852.   Specification of Letters Patent.   Patented Jan. 8, 1918.

Application filed July 19, 1917. Serial No. 181,571.

*To all whom it may concern:*

Be it known that I, JAMES SHULTZ, a citizen of the United States, residing at St. Joseph, in the county of Buchanan and State of Missouri, have invented certain new and useful Improvements in Merry-Go-Rounds, of which the following is a specification, reference being had therein to the accompanying drawing.

My invention relates to improvements in merry-go-rounds, which are designed for the amusement of children. The objects of my improvements are, to provide an easily operated, hand driven mechanism of this class, which shall be simple, substantial, and durable, be cheap in cost of manufacture, and in which all rods, braces and the like have been eliminated, and otherwise form the merry-go-round in such manner that it shall be safe against accidents to the users of it. Further objects are, to so construct and arrange the parts of a merry-go-round, that they may be quickly and easily separated and packed in the minimum amount of space, and in like manner be assembled and erected, into position for use.

I attain these objects by the mechanism illustrated in the accompanying drawings, in which:—

Figure 1 is a front view, certain parts being broken away.

Fig. 2 is a top plan of the merry-go-round.

My invention comprises the stand 1, of tubular form, the lower end portion of which is set in the ground 2. Upright 3 has its lower end secured in the upper end of said stand. Turn-table base 4 is securely mounted on the upper end of said upright, and has bevel gear 5 formed on its upper surface. Said base has bearing aperture 6 formed through the center thereof and ball race 7 formed in its upper surface. Turn-table 8 has a corresponding ball race 9 formed in its lower surface and flanges 10 formed on the upper surface thereof. Said turn-table has brackets 11 and the centrally situated journal pivot 12 formed therewith, depending therebelow. Said pivot extends into aperture 6, for rotatably holding said turn-table in place. The edge portion of said turn table extends downward, forming an annular flange 13 covering the edge of gear 5.

Beam 14 rests upon turn-table 8 and is secured in place, by bolts 15 and nuts 15'. Said bolts are passed through flanges 10, said beam and through angle plates 15", after which said nuts are tightened. Said angle plates are then secured on the upper surface of turn-table 8.

The operator's seat 16 is secured to one end of beam 14, which forms the back for said seat, which latter is provided with a foot rest 16'. Drive shaft 17 has its inner end rotatably mounted in turn-table 8, while its outer end is similarly mounted in bracket 18, which is secured on beam 14, adjacent to said seat.

Shaft 17 is covered by the tubular shaft housing 17', which has its inner end mounted on a boss 17" formed with turn-table 8, while the opposite end of said housing is mounted on boss 18', which is formed with bracket 18.

Bevel pinion 19 is secured on the inner end portion of said shaft and engages bevel gear 5. Crank 20 is provided with the ratcheted hub 21, which is connected with the outer end of shaft 17.

Since cranks which are ratchet connected with the ends of shafts, are old and well known, and since the crank 20 and its hub 21, form no original part of this invention, the structural details of said hub are neither shown nor described.

A plurality of bearing balls 22, are placed in ball race 7, while ball race 9 is supported upon said balls, forming an anti-friction bearing for turn-table 8.

The outer ends of studs 23 are secured in the lower end portions of brackets 11, while the inner end portions of said studs project therefrom, beneath the edge portion of turn-table base 4. Rollers 24 are rotatably mounted on said inner ends of said studs, for preventing turn-table 8 from tilting, when beam 14 is unevenly loaded. Gear shield 25, (see Fig. 2,) is secured on the undesignated one of flanges 10, for covering pinion 19.

In operation, the operator sits on seat 16, and manually rotates crank 20, which, by its shaft and gear connections, rotates turn-table 8 and the thereon carried beam 14, counter-clockwise.

The children who are amused by the merry-go-round, either hang by the arms, or sit astride beam 14, or otherwise dispose themselves as they see fit, upon any of the available parts of the merry-go-round, for taking a ride thereon.

It will be seen and understood, from the foregoing description that should a child fall from the merry-go-round, onto ground 2, the distance is so slight, that injury is not apt to accrue, and that the parts of the merry go round would harmlessly pass over him. It will be further understood, that a large number of children can find room on the moving parts of the merry-go-round, and that since the large plurality of seats usually provided have been omitted, the described amusement device can be furnished at extremely low cost.

Having fully described my invention, what I claim as new, and desire to secure by Letters Patent, is:—

A stand having its lower end portion set in the ground; an upright having its lower end secured in the upper end portion of said stand; a turn-table base secured on the upper end of said upright, said turn-table base having a bevel gear formed on its upper surface; a turn-table mounted on anti-friction bearings on said base; a beam secured on and across said turn-table; a seat secured on one end of said beam; crank and pinion driving means connected with said gear, whereby said turn-table is rotated in a horizontal plane and holding rollers carried by said turn-table, said rollers being rotatably mounted beneath the outer edge portion of said turn-table base for preventing said turn-table from tilting when said beam is unevenly loaded.

In testimony whereof I affix my signature in the presence of two witnesses.

JAMES SHULTZ.

Witnesses:
FRED C. MOEN,
LUTHER STOUFFER.

Copies of this patent may be obtained for five cents each, by addressing the "Commissioner of Patents, Washington, D. C."